(12) United States Patent
Jäckel et al.

(10) Patent No.: US 7,297,064 B2
(45) Date of Patent: Nov. 20, 2007

(54) TORSIONAL VIBRATION DAMPER

(75) Inventors: Johann Jäckel, Bühlertal (DE); Hartmut Mende, Bühl (DE); Bin Zhou, Bühl (DE)

(73) Assignee: Luk Lamellen und Kupplungsbau Beteiligungs KG, Buhl/Baden (DE)

( * ) Notice: Subject to any disclaimer, the term of this patent is extended or adjusted under 35 U.S.C. 154(b) by 115 days.

(21) Appl. No.: 10/094,503

(22) Filed: Mar. 8, 2002

(65) Prior Publication Data
US 2002/0128074 A1    Sep. 12, 2002

(30) Foreign Application Priority Data
Mar. 8, 2001  (DE) ................ 101 11 055

(51) Int. Cl.
*F16F 15/121* (2006.01)
(52) U.S. Cl. .................. 464/68.92; 464/68.9; 464/67.1
(58) Field of Classification Search .................. 464/66, 464/67, 68, 68.9, 68.92, 67.1; 192/203, 205; 267/179, 166, 180
See application file for complete search history.

(56) References Cited

U.S. PATENT DOCUMENTS

| | | | |
|---|---|---|---|
| 5,065,642 A | | 11/1991 | Kagiyama et al. |
| 5,161,660 A | | 11/1992 | Huber |
| 5,269,199 A | | 12/1993 | Umeyama |
| 5,562,542 A | * | 10/1996 | Rohrle .................. 464/67 |
| 5,632,365 A | | 5/1997 | Maucher |
| 5,673,598 A | * | 10/1997 | Duclos .................. 464/68 |
| 5,759,106 A | | 6/1998 | Reik et al. |
| 5,784,928 A | * | 7/1998 | Mokdad et al. ........ 464/68 |
| 5,863,253 A | * | 1/1999 | Rohs et al. ............ 464/66 |
| 5,882,264 A | * | 3/1999 | Yabe et al. ............ 464/66 |
| 5,980,386 A | | 11/1999 | Friedmann et al. |
| 6,247,571 B1 | * | 6/2001 | Nakane et al. ........ 192/205 |
| 6,575,838 B2 | * | 6/2003 | Jackel et al. .......... 464/67 |

FOREIGN PATENT DOCUMENTS

| | | |
|---|---|---|
| DE | 199 12 970 A1 | 3/1999 |
| EP | 0 397 155 A1 | 11/1990 |
| EP | 1 058 028 A2 | 12/2000 |
| FR | 2 602 839 A1 | 2/1988 |
| FR | 2 620 501 A1 | 3/1989 |
| FR | 2 620 503 A1 | 3/1989 |

* cited by examiner

*Primary Examiner*—Aaron Dunwoody
(74) *Attorney, Agent, or Firm*—Darby & Darby

(57) ABSTRACT

A torsional vibration damper, particularly for use in the power train of a motor vehicle, employs one or more preferably arcuate coil springs having constant inner radii and one or more sets of neighboring smaller-diameter convolutions next to one or more sets of neighboring larger-diameter convolutions. The coil spring or springs is or are compressible by the retainers of two components which can turn, about a common axis, with and relative to each other and at least one of which defines a chamber for the coil spring(s). The retainers of the components can act upon the adjacent end convolutions of the coil spring or of two or more series-arranged coil springs between them by way of plastic slide elements and/or elastic bumpers. One or more plastic slides can partially surround selected convolutions to maintain it or them out of contact with the surface surrounding the coil spring(s) even when such spring or springs is or are being acted upon by centrifugal force in response to high-speed rotation of the components.

20 Claims, 6 Drawing Sheets

TORSIONAL VIBRATION DAMPER

BACKGROUND OF THE INVENTION

This invention relates to improvements in torsional vibration dampers of the type wherein two coaxial rotary components are turnable relative to each other against the opposition of one or more one-piece or composite coil springs. Torsional vibration dampers of such character can be utilized with advantage in the power trains of motor vehicles, e.g., they can constitute composite flywheel assemblies between the output shafts of prime movers (such as the crankshafts or camshafts of internal combustion engines) and the housings or pressure plates of friction clutches, or composite clutch discs (also called clutch plates) in the friction clutches which operate between the prime movers and the change-speed transmissions of motor vehicles.

A torsional vibration damper which embodies one or more features of the present invention is disclosed, for example, in published German patent application No. 199 12 970 A1. This publication discloses a damper wherein the means for yieldably opposing rotation of at least one component of two coaxial rotary components comprises an elongated arcuate compression coil spring having two end coils or convolutions and a plurality of intermediate coils or convolutions (hereinafter, such constituents of the coil spring will be referred to as convolutions). The intermediate convolutions include a first set having first outer diameters and at least one additional set having different second outer diameters. The two coaxial rotary components of the torsional vibration damper embodying the just described coil spring are flywheels in the form of shells together forming a housing which defines an elongated arcuate chamber for the coil spring. Each shell has a retainer which is confined in the chamber, and each end convolution of the coil spring abuts a different one of the two retainers so that the spring opposes angular movements of the retainers toward each other but urges such retainers away from each other.

A drawback of the just described conventional torsional vibration damper is that, when the two components are driven to rotate jointly at a high speed, the intermediate convolutions of the coil spring move or tend to move radially outwardly under the action of centrifugal force and come into pronounced frictional engagement with the internal surfaces which surround the arcuate chamber being defined by the two components. Such frictional engagement between the intermediate convolutions of the coil spring and the adjacent portions of the two components is undesirable on several grounds. For example, the internal surfaces of the two components and the surfaces of the radially outermost portions of the intermediate convolutions of the coil spring undergo pronounced wear and generate heat which must be dissipated, often at a high cost involving time and/or material, e.g., due to the need for the use of expensive materials for the components and/or due to the need for the application of highly wear-resistant coatings or the like.

Reference may also be had to commonly owned U.S. Pat. No. 5,980,386 (granted Nov. 9, 1999 to Friedmann et al. and disclosing a torsional vibration damper between a rotary output element of a prime mover and a friction clutch), U.S. Pat. No. 5,759,106 (granted Jun. 2, 1998 to Reik et al. and disclosing a different torsional vibration damper between a rotary output element of an engine and the rotary input element of a friction clutch), U.S. Pat. No. 5,632,365 (granted May 27, 1997 to Maucher and disclosing a clutch disc embodying a torsional vibration damper between a set of friction linings (which are flanked by and receive torque from the pressure plate and the counterpressure plate of a friction clutch) and the input shaft of the change-speed transmission), as well as U.S. Pat. No. 5,161,660 (granted Nov. 10, 1992 to Huber and disclosing a clutch plate or clutch disc with several discrete coil springs operating between two constituents of torque transmitting means installed between the flywheels and the engine on the one hand, and the input element of the change-speed transmission on the other hand). The disclosure of each of the aforementioned U.S. patents is incorporated herein by reference.

OBJECTS OF THE INVENTION

An object of the present invention is to reduce, preferably to zero or close to zero, friction between the compression coil spring or springs and the surfaces bounding the chamber defined by those components of a torsion vibration damper which can turn relative to each other by overcoming the resistance of the coil spring or springs.

Another object of the invention is to provide a torsional vibration damper which can offer a highly predictable resistance to turning of the two coaxial components of the damper relative to each other.

A further object of our invention is to provide a torsional vibration damper whose operation is not or need not be influenced by centrifugal force, or is influenced less than the operation of conventional torsional vibration dampers.

An additional object of the invention is to provide a torsional vibration damper which generates less noise than conventional dampers employing one or more compression coil springs.

Still another object of the present invention is to provide a relatively simple, compact and inexpensive torsional vibration damper which can be put to use under all or nearly all circumstances involving the damping of torsional vibrations, e.g., in the power trains of motor vehicles.

A further object of the invention is to provide a novel and improved method of reducing wear upon the constituents of torsional vibration dampers which employ coil springs.

Another object of our invention is to provide a novel and improved method of reducing noise being generated by torsional vibration dampers employing one or more coil springs.

An additional object of the instant invention is to provide a novel and improved method of enhancing the damping action of torsional vibration dampers which utilize coil springs.

Still another object of this invention is to provide novel and improved coil springs.

A further object of the invention is to provide novel and improved coil springs which can be utilized with advantage in existing types of torsional vibration dampers.

Another object of the present invention is to provide a power train for use in motor vehicles which employs one or more torsional vibration dampers of the above outlined character.

An additional object of our present invention is to provide a novel and improved friction clutch for use in the power trains of motor vehicles.

Still another object of this invention is to provide novel and improved means for guiding the coil spring or springs in the chamber of a torsional vibration damper.

SUMMARY OF THE INVENTION

One feature of the present invention resides in the provision of a torsional vibration damper, e.g., for use in the power train of a motor vehicle, which comprises a first component turnable about a predetermined axis, a second component also turnable about such (common) axis with and relative to the first component, and at least one elongated (straight or arcuate, such as part circular) coil spring which is interposed between the components and is arranged to oppose turning of such components relative to each other. The at least one coil spring has a first end portion bearing (directly or indirectly) upon a retainer or stop of one of the components, a second end portion reacting against a retainer or stop of the other component, and a third portion which is interposed between the end portions or sections and may but need not always have a diameter larger or smaller from that or from those of the first end portion or of both end portions.

The first and second components form parts of or constitute a housing for the at least one elongated coil spring and can constitute or form part of discrete flywheels of a composite flywheel.

Another presently preferred feature of our invention resides in the provision of a torsional vibration damper which comprises a first component turnable about a predetermined axis, a second component turnable about the predetermined axis with and relative to the first component, and at least one arcuate coil spring which is interposed between the two components and serves to prevent them from turning relative to each other, either clockwise or anticlockwise. The at least one coil spring bears upon a first retainer or stop which is turnable with (e.g., which forms part of) the first component, reacts (directly or indirectly) against a second retainer which is turnable with and can form part of the second component, has a constant inner radius, and comprises convolutions including at least one first set of convolutions having first outer diameters and at least one second set of convolutions having second outer diameters greater than the first outer diameters. The transmission of force between the at least one coil spring and the second retainer can take place directly or indirectly, the same as the transmission of force between the at least one coil spring and the first retainer.

The first and second components of the just described embodiment of the improved torsional vibration damper can but need not constitute discrete flywheels of a composite flywheel.

The convolutions of the at least one first set can include two end convolutions and at least one intermediate convolutions The outer diameters of the end convolutions are or can be greater than the outer diameter of the at laast one intermediate convolution.

In accordance with a modification of the just outlined embodiment, the coil spring comprises two end convolutions and a plurality of intermediate convolutions. The outer diameters of convolutions of the at least one first set decrease from the outer convolutions toward at least one median or central convolution of the plurality of intermediate convolutions.

At least one of the two components has an internal surface which defines an arcuate chamber for the at least one coil spring, i.e., such chamber may but need not be bounded by one of the components or by both components. The convolutions of the at least one first set are spaced apart from the internal surface, and the convolutions of the at least one second set of convolutions are or can be nearer to the internal surface than the convolutions of the at least one first set. In fact, the convolutions of the at least one second set are or can be in sliding contact with the internal surface. Such damper can further comprise at least one friction reducing slide which is disposed in the chamber between the internal surface and the convolutions of the at least one first set. The slide is or can be mounted in such a way that it is movable relative to the components of the torsional vibration damper and that it surrounds the convolutions of the at least one first set. Such slide can include a cylinder having an at least substantially smooth outer surface and an inner surface which is adjacent the convolutions of the at least one first set of convolutions. The inner and outer surfaces can extend along an arc of less than 360 degrees (as seen circumferentially of the convolutions of the at least one first set. Furthermore, at least a portion of the at least one slide can consist of a plastic material. In accordance with one presently preferred embodiment, the at least one slide partially surrounds the convolutions of the at least one set and extends along an arc of in excess of 180 degrees but less than 360 degrees, as seen circumferentially of the convolutions of the at least one first set.

The convolutions of the at least one first set can include at least one convolution having a radially outer portion which is anchored in the at least one slide for joint movement in the chamber. The inner surface of such slide can be provided with a groove for the radially outer portion of the at least one convolution of the at least one first set. The outer diameter of the at least one convolution of the at least one first set of convolutions can be greater than that of each other covolution of the at least one first set of convolutions, and the radially outermost portion of the at least one convolution can be snugly received in the groove of the at least one slide.

The convolutions of the at least one first set can further include two additional convolutions which flank and lie flush against the at least one convolution.

The at least one first set of convolutions can be disposed at one end of the at least one coil spring, and such damper can further include a slide element which abuts the first retainer and surrounds the convolutions of the at least one first set. The slide element can be installed and arranged to share the movements of the first component and can be in sliding contact with the second component. The internal surface of at least one of the first and second components of the damper can define the aforementioned arcuate chamber for the at least one coil spring, and the slide element can include a substantially disc-shaped base which is disposed between the first retainer and one convolution of the at least one first set. The slide element can further include a part cylindrical portion which is disposed between at least one convolution of the at least one first set of convolutions and the internal surface. The inner surface of the part cylindrical portion of the slide element can include an at least substantially conical portion which tapers toward the base of the slide element and surrounds the at least one convolution of the at least one first set. The base of the slide element can be provided with an at least substantially flat surface which is adjacent the first retainer. Alternatively, the base of the slide element and the first retainer can be provided with surfaces including portions which abut each other and are remotest from the common axis of the two components of such damper. The base of the slide element and the first retainer can be respectively provided with first and second surfaces which are adjacent each other and include abutting portions which are remotest from the common axis of the two components.

The base of the slide element can overlie a portion of the adjacent convolution of the at least one first set of convolutions, and the first component of the damper can be provided with at least one projection which abuts the adjacent convolution. The projection can include a stepped portion of the first component.

The improved damper can further comprise an elastic bumper which is interposed between at least one of the retainers and the adjacent convolution of the at least one spring. The bumper can resemble or constitute a cylinder or a sphere. The width of the bumper (as measured radially of the common axis of the two components, can equal or approximate the outer diameter of the adjacent convolution of the at least one spring. It is also possible to dimension and configurate the bumper in such a way that it extends into that convolution of the at least one spring which is adjacent the one retainer. The latter can be provided with a protuberance which abuts the bumper and can extend into the adjacent convolution or convolutions.

Still another feature of the invention resides in the provision of a torsional vibration damper which comprises a first component turnable about a predetermined axis, a second component which is turnable about the predetermined axis with and relative to the first component, and a composite arcuate coil spring which is interposed between the two components and is arranged to oppose turning of the components relative to each other. The composite spring comprises series-connected first and second coil springs. A first end of the first spring bears upon a first retainer which is provided on the first component of the damper, and a first end of the second spring reacts against a second retainer which is provided on the second component. The second ends of the first and second springs are adjacent each other and include first convolutions having first outer diameters. Each of the first and second springs further includes second convolutions having second outer diameters greater than the first outer diameters. The damper further comprises a slide which is disposed at the second ends of the first and second springs and is movable with the second ends of the first and second springs while being maintained in sliding engagement with the two components.

The slide can include a substantially disc-shaped first portion which is disposed between the second ends of the first and second springs, and a substantially hollow cylindrical portion which at least partially surrounds at least one first convolution of each of the first and second springs. As already mentioned hereinbefore, at least one of the two components of the damper can be provided with an arcuate internal surface which defines a chamber for the first and second springs and for the slide, and the external surface of the second portion of the slide is slidable along the internal surface of the at least one component.

The just discussed damper can further comprise first and second slide elements each disposed between the first end of a different one of the first and second coil springs and the respective retainer and being in sliding engagement with one of the components.

An additional feature of the present invention resides in the provision of a novel and improved article of manufacture, namely a coil spring of finite length for use, for example, in a torsional vibration damper. The improved spring has a plurality of convolutions including at least one first set having first diameters and at least one second set having second diameters greater than the first diameters.

The improved coil spring can comprise two sets of first convolutions, and the at least one second set of convolutions can be disposed between the two sets of first convolutions.

Alternatively, the coil spring can include two sets of second convolutions and one set of first convolutions between the two second sets.

In accordance with a further modification, the convolutions of the at least one first set can include a plurality of neighboring convolutions having different diameters.

All of the convolutions can form an arc having a constant inner radius. Such convolutions can include a plurality of first sets and a plurality of second sets which alternate with the first sets.

The novel features which are considered as characteristic of the invention are set forth in particular in the appended claims. The improved torsional vibration damper and the improved coil spring, however, both as to their construction and the modes of making, assembling and utilizing the same, together with numerous additional important and advantageous features and attributes thereof, will be best understood upon perusal of the following detailed description of certain presently preferred specific embodiments with reference to the accompanying drawing.

DESCRIPTION OF PREFERRED EMBODIMENTS

Figure 1:
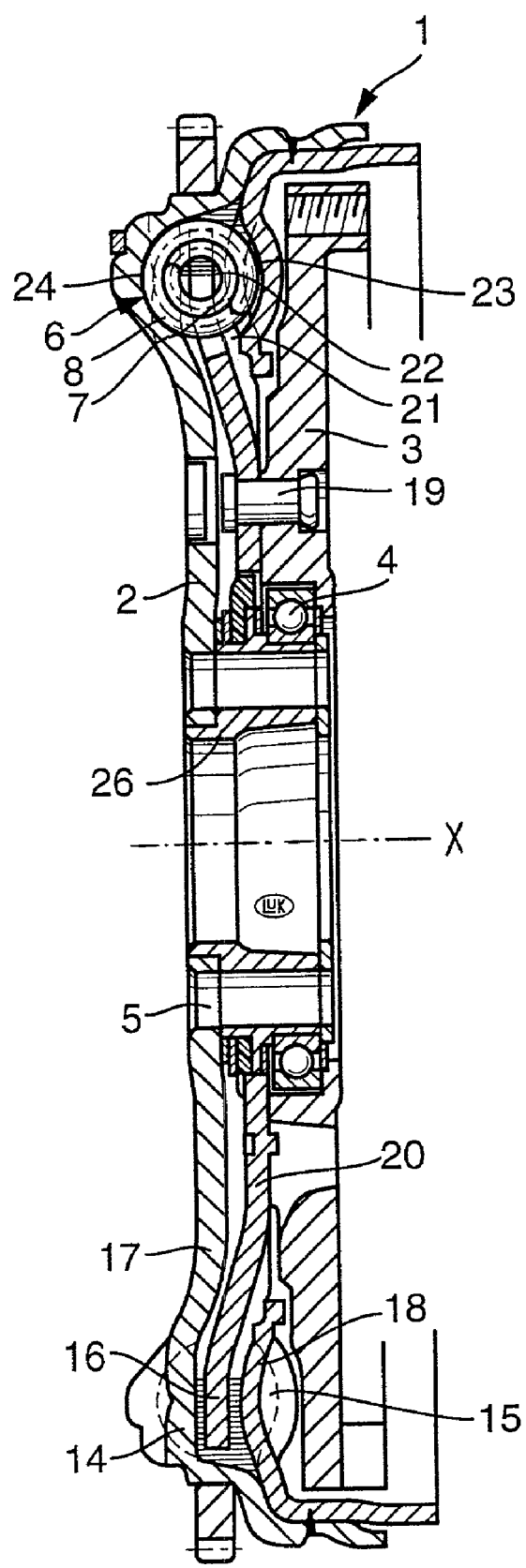
FIG. 1 is an axial sectional view of a torsional vibration damper which embodies one form of the present invention and employs one or more arcuate coil springs cooperating with retainers provided on two coaxial components which are turnable relative to each other about a common axis and one of which defines an arcuate chamber for the coil spring or springs.
Figure 2:
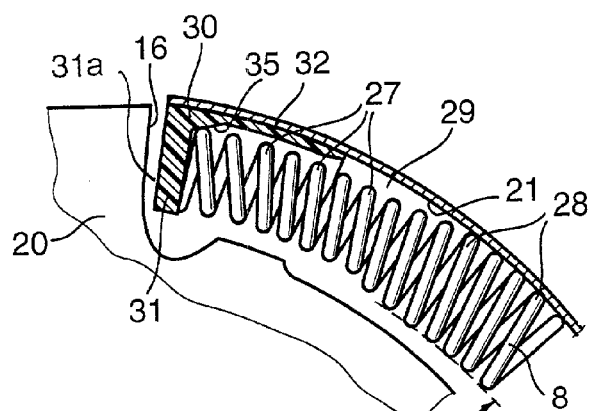
FIG. 2 is an enlarged fragmentary transverse sectional view showing a portion of one of the components with its retainer, a portion of one coil spring and a slide element of the damper which is illustrated in FIG. 1.

Referring to FIGS. 1 and 2, there is shown a torsional vibration damper 1 which is a composite flywheel and is assumed to be mounted in the power train of a motor vehicle including a prime mover, such as an internal combustion engine having a rotary output element (e.g., a camshaft or a crankshaft) serving to drive a first rotary component 2 (primary flywheel) of the damper 1. The output element of the prime mover is affixed to the component 2 by a set of bolts or analogous fasteners, not shown, extending through holes 5 provided in a central portion 26 of the component 2. The illustrated central portion 26 is a hub which surrounds the input shaft (not shown) of the change-speed transmission in the power train.

The damper 1 further comprises a second rotary component (secondary flywheel) which, in the embodiment of FIGS. 1 and 2, is assembled of two parts, namely a shell 3 and a washer-like part 20 riveted (at 19) to the shell 3. The shell 3 can constitute the counterpressure plate of an engageable and disengageable friction clutch which, when engaged, serves to transmit torque between the aforementioned output element of the prime mover and the input shaft of the transmission.

The components 2 and 3,20 of the damper 1 are rotatable with and relative to each other about a common axis X. An antifriction ball bearing 4 is interposed between the hub 26 of the component 2 and the radially innermost portion of the shell 3 of the secondary flywheel (second component) of the composite flywheel constituting the damper 1. The component 2 has one or more first retainers 14, 15 (only one shown in FIG. 1) which cooperates or cooperate with one or more retainers 16 provided on the washer-like part 20 to stress or to relax the bias of a resilient unit 6 including one, two or more arcuate coil springs 8 of finite length. One end convolution of the coil spring 8 bears upon the retainer 14, 15 of the component 2 and the other end convolution of such coil spring 8 reacts against the retainer 16 of the part 20 of the composite second component 3,20.

The radially outermost portion 24 of a first section 17 of the component 2 cooperates with the radially outermost portion 23 of a second section 18 of the component 2 to define an annular or arcuate chamber 29 bounded by the internal surfaces 22, 21 of the portions 24, 23 and receiving the coil spring or springs 8. The radially outermost portion of the washer-like part 20 extends radially outwardly and into the chamber 29 to serve as the retainer 16 for one end convolution of the coil spring 8. The component 2 is made of metallic sheet stock and its retainer 14,15 is constituted by deformed end portions of its welded-together sections 17, 18.

When the output shaft of the engine drives the component 2, the composite retainer 14, 15 of sections 17, 18 bears upon the adjacent end convolution of the coil spring 8 so that the latter stores energy which is necessary to transmit torque to and to turn the component 3,20. If the friction clutch is engaged, the component 3,20 rotates the clutch disc of the friction clutch and the clutch disc rotates the input shaft of the change-speed transmission.

The retainer 16 can constitute a radially outwardly. extending arm of the washer-like part 20 of the second component 3,20. The section 17 of the component 2 can constitute a converted (cold formed) sheet metal blank and serves to secure the component 2, and hence the entire damper 1, to the output shaft of the engine. The part 20 preferably also consists of sheet metal and is cold formed or otherwise deformed to exhibit the portion 15 of the composite retainer 14,15 of the component 2. The deformed radially outer portions 24, 23 of the sections 17, 18 define the aforementioned annular chamber 29 (FIG. 2) for the spring 8 and the retainers 14-15, 16. The chamber 29 has a toroidal shape and at least a portion thereof is preferably filled with a lubricant 7 (such as grease) for the energy storing unit 6 of the damper 1. The portions 24, 23 of the sections 17, 18 can further serve as a guide means for the convolutions or for certain convolutions of the coil spring 8 and as a means for limiting lateral displacements of such convolutions when the spring 8 is caused to store energy as a result of angular movements of the component 2 relative to the component 3,20 and/or vice versa.

At least when the engine drives the damper 1, the convolutions of the coil spring 8 are acted upon by centrifugal force and move or tend to move radially outwardly (i.e., away from the common axis X of the components 2 and 3,20) against the radially outwardly adjacent portions 24, 23 of the sections 17, 18, i.e., against the internal surfaces 21 and 22. The extent of wear upon the sections 17, 18 and/or upon the convolutions of the spring 8 can be reduced (even to zero) by resorting to one or more suitable inserts which are borne by the sections 17, 18 of the component 2 and are radially outwardly adjacent the convolutions of the spring. Reference may be had, for example, to FIG. 9 of the aforementioned commonly owned U.S. Pat. No. 5,980,386 to Friedmann et al. Such insert or inserts can be made of hardened metallic sheet material. In addition to preventing wear upon certain adjacent parts and/or to reducing wear upon certain additional parts, such insert or insrts can also serve as a means for frictionally damping undesirable stray movements of parts which are in contact therewith and which move relative to each other and/or relative to the inserts when the component 2 turns relative to the component 3,20 and/or vice versa. The magnitude or extent of frictional damping action is a function of the RPM of the damper 1.

FIG. 2 illustrates a detail of the structure shown in FIG. 1 drawn to a larger scale and turned through 90°. The arcuate coil spring 8 has a first set of smaller-diameter convolutions 27 adjacent the retainer 16 of the washer-like part 20, i.e., of the second component 3,20, a second set of convolutions 27 (not shown) adjacent the retainer 14,15 (also not shown) of the component 2, and a set of convolutions 28 between the two sets of convolutions 27. The inner radius R of the coil spring 8 is constant, i.e., all convolutions of the coil spring 8 have their innermost portions on a circle having the radius R and its center on the axis X. The ends of the set of intermediate convolutions 28 are constituted by two or more convolutions whose diameters provide gradual transitions between those of the centrally located convolutions 28 and the convolutions 27 of the two sets adjacent the retainers 16 and 14,15.

An important advantage of the aforementioned selection of the diameters of the two sets of convolutions 27 and of the one set of convolutions 28, together with the unchanging inner radius R of the entire coil spring 8, is that the radially outermost portions of the convolutions 27 are spaced apart from the internal surfaces 21, 22 (only the surface 21 is identified in FIG. 2) of the component 2 including the sections 17, 18 by a clearance which forms part of the chamber 29 and the width of which (as seen radially of the axis X) increases gradually from the convolutions 28 toward both retainers (14,15 and 16) and is constant or nearly constant in the regions outwardly adjacent the two sets of convolutions 27.

The structure which is shown in FIGS. 1 and 2 further comprises two slide elements 30 of which only one is shown in FIG. 2. The illustrated slide element 30 comprises a substantially disc-shaped base 31 between the retainer 16 and the adjacent end convolution 27, and a part cylindrical (i.e., trough- or channel-shaped) portion 32 which surrounds or flanks the sides and the radially outermost portions of the illustrated set of convolutions 27. The illustrated hollow part cylindrical portion 32 constitutes approximately one-half or more than one-half of a circumferentially complete cylinder (see the guide element 66 shown in FIG. 11). The thickness of the part cylindrical portion 32 is selected in such a way that this portion fills or substantially fills the end portion of the chamber 29 which surrounds the convolutions of the set of smaller-diameter convolutions 27 adjacent the base 31 of the guide element 30 shown in FIG. 2. The guide element 30 need not have a circumferentially complete radially inner portion because the convolutions 27 of FIG. 2 do not exhibit a tendency to move radially inwardly.

When the damper 1 is in use, the outermost smaller-diameter convolutions 27 (as seen longitudinally of the coil spring 8) bear against the conical portions of the inner sides or surfaces of the portions 32 of slide elements 30 at both ends of the coil spring 8. The conical portions 35 maintain the convolutions 27 out of contact with the internal surfaces 21, 22 of the component 2 (as already stated above, only the internal surface 21 can be seen in FIG. 2 as well as in many other Figures which illustrate a portion of the component 2). The slide elements 30 even hold the convolutions 28 against radially outward movement into contact with the internal surface 21. The slide elements 30 are preferably made of a suitable plastic material which can slide relative to the component 2 with minimal friction.

Figure 6:
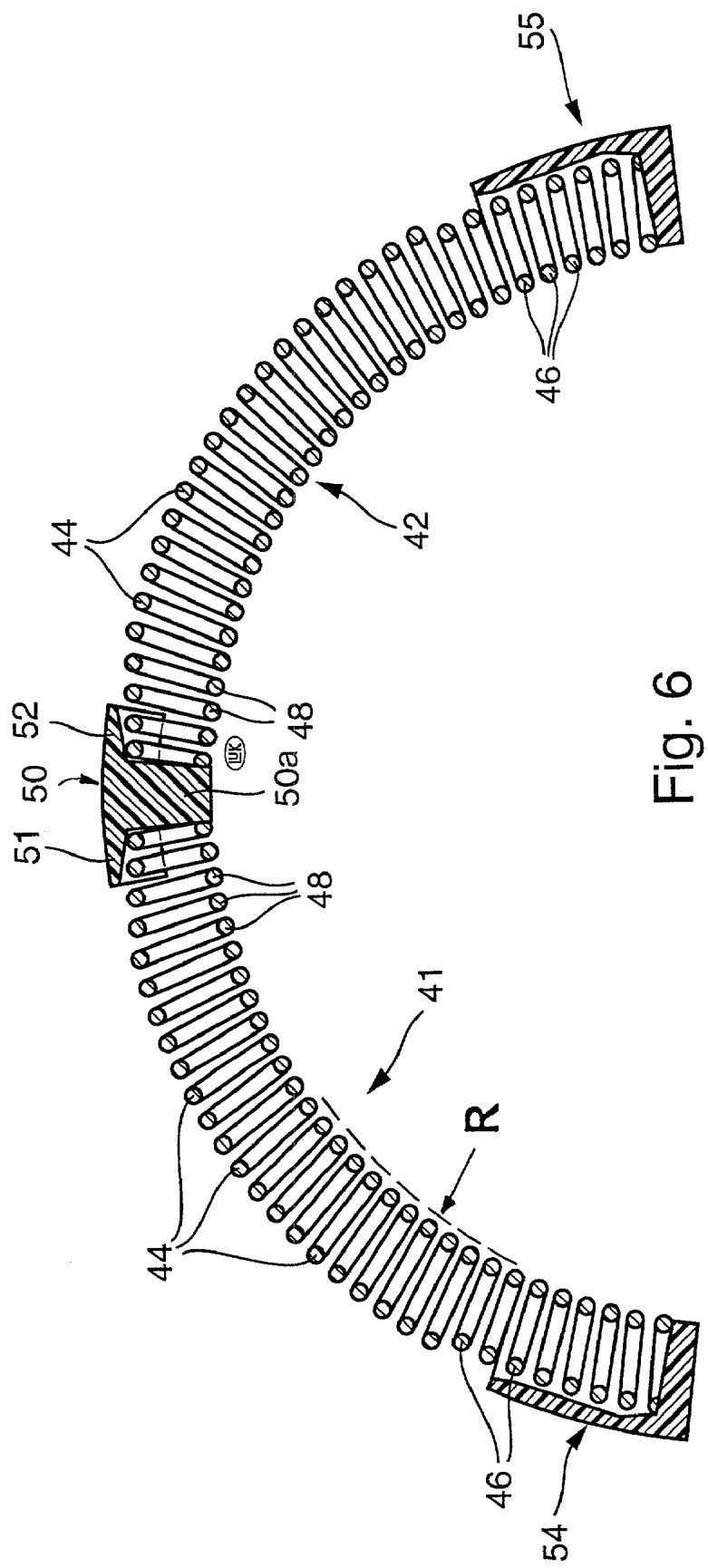
FIG. 6 is a sectional view of two series-connected arcuate coil springs with a slide between them and with slide elements at their free ends.
Figure 7:
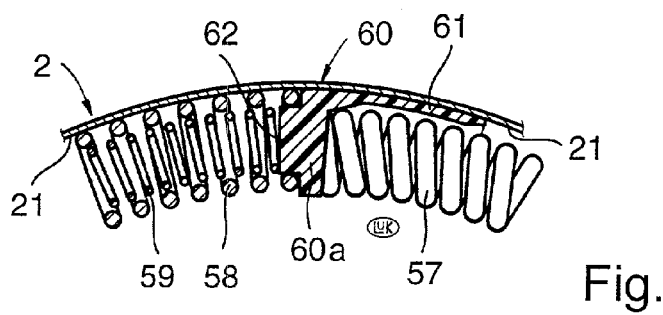
FIG. 7 is a fragmentary sectional view of a group of coil springs and of a slide constituting modifications of certain parts in the arrangement of FIG. 6.

As utilized in the claims, the term "coil spring" or "at least one coil spring" can denote a one-piece coil spring (see FIG. 17) as well as a composite coil spring with two or more discrete coil springs arranged in series (see FIG. 6) or a composite coil spring with one coil spring confined in another (see FIG. 7). The improved coil spring(s) can but need not always have an arcuate shape. Reference may be had, for example, to FIG. 2 of the aforementioned U.S. Pat. No. 5,161,660 to Huber. It is often of advantage to impart to the improved coil spring (such as 41 or 42 shown in FIG. 6) an arcuate shape prior to installation in the arcuate chamber defined by at least one of two or more relatively movable components of the housing forming part of the improved torsional vibration damper.

As already mentioned above, a coil spring which is to be utilized in the torsional vibration damper of the present invention, or a coil spring which embodies our invention irrespective of its use, can consist of a single series of integral convolutions or of two or more discrete coil springs which can be disposed in series, i.e., end-to-end. One of such plurality of discrete coil springs, or two or all springs, can be arcuate or straight, i.e., it or some or all of them can have a straight longitudinal axis or a common straight longitudinal axis. However, in their entirety, the axes of two or more discrete coil springs can form an arc or a polygon. In the latter instance, the axes of a polygonal array of plural coil springs are tangential to an arc, i.e., the axis of each straight coil spring has a point which is disposed at a predetermined radial distance from a common axis, i.e., each such distance is the same. Reference may be had again to FIG. 2 of the commonly owned U.S. Pat. No. 5,161,660 to Huber.

An important advantage of the feature that the coil spring 8 comprises a number of convolutions 27 having relatively small diameters and that the inner radius R of the coil spring is constant is that the convolutions 27 cannot come into contact with the internal surface 21 bounding the chamber 29 except under certain infrequent circumstances, e.g., when the RPM of the damper 1 is sufficiently high to enable the centrifugal force to move the convolutions 27 radially outwardly. Such configuration of the coil spring 8 entails a reduction of hysteresis, at least in the region(s) of the smaller-diameter convolutions 27.

The radially outermost portions of the larger-diameter convolutions 28 can come into contact with the internal surface 21 and serve to guide the coil spring 8 at least in the radially outermost portion of the chamber 29. It has been ascertained that, due to the provision of one but preferably more sets of smaller-diameter convolutions 27, the overall friction between the coil spring 8 and the relatively turnable components (2 and 3,20) of the damper 1 is much lower than in dampers which employ conventional coil springs.

The configuration of the surface or surfaces 21, 22 bounding the chamber 29 is or can be such that they can guide the coil spring 8 against excessive radially outwardly directed as well as against any or against excessive lateral movements in the direction of the axis X. This can be readily accomplished by confining at least some of the convolutions of the coil spring 8 along arcs of more than 180° (see the upper part of FIG. 1).

Figure 12:
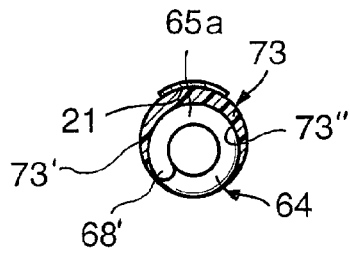
FIG. 12 is a fragmentary sectional view as seen in the direction of arrows from the line XII-XII of FIG. 10.

As shown in FIG. 2, the outer diameters of convolutions 27 of the set adjacent to the base 31 of the slide element 30 increase stepwise from convolution to convolution or in pairs or larger groups of neighboring convolutions 27 or in a direction toward the set of convolutions 28 having larger outer diameters than any of the convolutions 27. Such coil spring can consist of two halves which are mirror images of each other with reference to a plane which includes the axis X, and the number of convolutions 27 in the set adjacent the slide element 30 which is shown in FIG. 2 is or can be identical with the number of convolutions 27 at the other end of the coil spring 8, i.e., at the non-illustrated slide element which is or which can be a mirror image of the slide element 30 of FIG. 2. The coil spring 8 can extend along an arc of, e.g., 180°, 60°, 90°, 120° or another arc. For example, the four coil springs three of which are shown in FIG. 12 of the aforementioned U.S. Pat. No. 5,980,386 to Friedmann et al. extend along arcs of somewhat less than 90°; such damper comprises eight slides because each of the coil springs consists or is assumed to consist of a single set of coherent convolutions having identical outer diameters.

Figure 10:
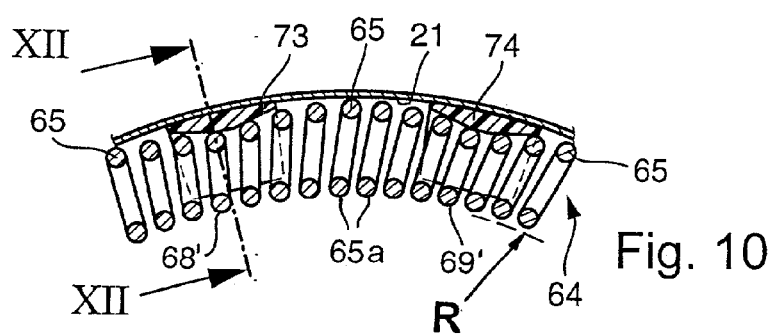
FIG. 10 shows a structure similar to that of FIG. 8 but employing different slides.

The outer diameters of the convolutions 27 of the left-hand set forming part of the coil spring 8 shown in FIG. 2 increase gradually (i.e., without pronounced changes from convolution to convolution) all the way from the base 31 of the slide element 30 to the first larger-diameter convolution 28, and such transition can continue beyond the portion 32 of the slide element 30. Alternatively, and as will be described, for example, with reference to the embodiment of FIG. 10, the outer diameters of convolutions (such as those denoted by reference characters 65*a*) can increase from the median convolution(s) toward both ends of the set or sets consisting of such convolutions. This can take place at one end, at both ends, in the median portion or in two or more inner portions of a coil spring. FIG. 10 shows a coil spring 64 which is assumed to have at least two (as actually shown) intermediate sets of smaller-diameter convolutions 65*a* and two additional sets (not shown) at both ends of the coil spring 64. The two sets of convolutions 65*a* shown in FIG. 10 resemble the median portions of hourglasses and each set of convolutions 65 resembles the top portion or the bottom portion of the hourglass. A smooth transition between a set of convolutions 65*a* and each adjacent set of convolutions 65 has been found to contribute significantly to the advantages of such coil spring over those known in the art. For example, a coil spring of such character does not buckle or is less likely to buckle or break in actual use, such as in a torsional vibration damper.

The slide element or elements 30, as well as the slides, slide elements and/or bumpers to be described hereinafter with reference to FIGS. 3 to 16, exhibits or exhibit the important advantage that each thereof further reduces the likelihood, or eliminates the possibility, of wear upon each convolution which is prevented from coming in actual contact with one or more parts of the components (housing) of the improved torsional vibration damper. In fact, a slide, a slide element or a bumper can prevent wear upon convolutions which are not actually overlapped by one or more portions of a slide element or the like, such as by the part 32 of the slide element 30 shown in FIG. 2, because such convolution(s) is or are prevented from reaching the surface 21 even when the coil spring 8 is rotated at a very high speed so that it is subjected to the action of a very pronounced centrifugal force.

The configuration of the internal surface of the slide element 30 is preferably complementary to that of the adjacent set of convolutions 27; such internal surface is a partly cylindrical surface and the part 32 of the slide element 30 can be said to constitute a trough which overlies the adjacent convolutions 27 and is located between such convolutions and the internal surface. The external surfaces of the base 31 and the part 32 of the slide element 30 are preferably smooth. Conformance of the inner side or surface of the part 32 to the adjacent side of the set of convolutions 27 greatly reduces the extent or eliminates the possibility of relative movement between the part 32 and the adjacent convolutions 27. The feature that the outer side of the part 32 is smooth reduces the likelihood of pronounced friction between such outer side and the internal surface 21.

As already explained hereinabove, the part 32 of the slide element 30 can overlie the adjacent convolutions along an arc of between 180' and 360°. However, it is sufficient (at least under certain circumstances) to employ a slide element having a part 32 which overlies the adjacent convolutions along an arc of not more than 90°. An advantage of slide elements having portions 32 extending along arcs of more than 180° is that such slide elements can be deformed for the purpose of surrounding more than one-half of each adjacent convolution 27 to be thereupon released so as to engage one or more convolutions 27 by snap action. This is advisable because such engagement of a slide element 30 with the adjacent convolution(s) 27 reduces the likelihood of accidental (unintentional) separation of the slide element 30 from the coil spring 8. Furthermore, the slide element 30 can be caused to properly engage the adjacent convolution(s) 27 before the coil spring 8 is inserted into the chamber 29, preferably in a prebent condition so that its curvature is the same as that of the chamber 29. Such mounting of the slide element 30 on the convolutions 27 prior to insertion of the coil spring 8 into the arcuate chamber 29 greatly simplifies the assembly of the damper 1.

The slide element 30 can be made of a suitable plastic material, preferably of a material which exhibits sufficient resiliency to permit convenient temporary expansion of the part 32 in order to enable a person or an automaton to assemble the temporarily expanded part 32 with a set of convolutions 27, i.e., with a spring 8.

Figure 8:
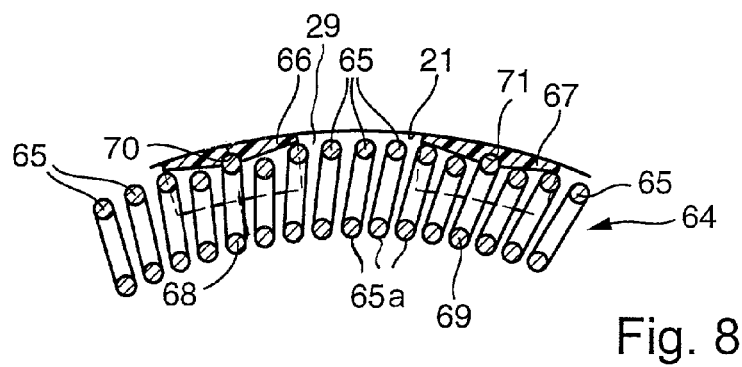
FIG. 8 is a fragmentary sectional view of a coil spring and of two slides which are coupled to adjacent convolutions of the coil spring.
Figure 9:
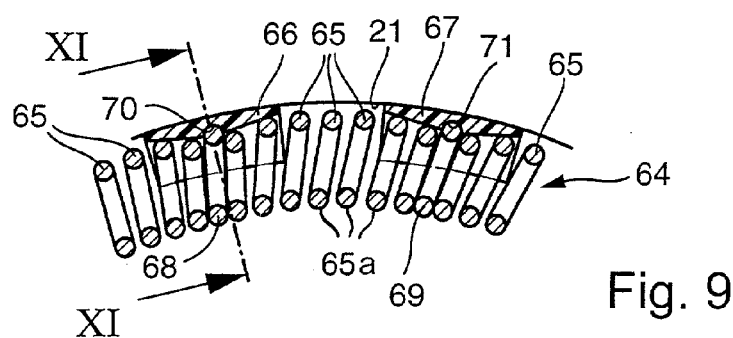
FIG. 9 shows a structure similar to that of FIG. 8 but employing a different coil spring.

The utilization of an elastically expandable slide element is of particular advantage if such slide element or a functional equivalent thereof is to be mounted on an intermediate portion of the coil spring (see, for example, the modified slide element 50 in FIG. 6 or the pairs of slides 66, 67 and 73, 74 respectively shown in FIGS. 8-9 and 10.

An advantage of plastic slides and slide elements is that they can be mass produced (e.g., in an injection molding machine) at a small fraction of the cost of metallic slides or slide elements. The elasticity of such slides or slide elements need not be very pronounced because the elasticity of the convolutions 27 also contributes to convenient snapping of the preferably resilient and preferably plastic slide element 30 onto the selected set of convolutions 27. In fact, the elasticity of the convolutions 27 can suffice to properly couple such convolutions to a rigid or practically rigid slide or slide element (such as the element 30) if the part 32 does not extend along an arc greatly exceeding 180°.

An additional advantage of the slide element 30 is that it permits the convolutions 27 to move toward and/or away from each other under circumstances (such as at a certain RPM of the damper 1) which prevent the larger-diameter convolutions 28 to slide or simply move along the internal surface 21 of the component 2. This improves the operation of the coil spring 8 when the damper 1 is caused to act in opposite directions (i.e., when at least one of the components 2 and 3,20 is caused to repeatedly turn clockwise as well as counterclockwise relative to the other component.

The conical portion 35 of the inner side or surface of the part 32 of the slide element 30 contributes to more satisfactory operation of the damper 1 in that it urges at least the outermost convolution 27 (i.e., that which is nearest to the base 31) radially inwardly toward the axis X. This, in turn, maintains the remaining convolutions 27 of the set of such convolutions out of contact with the radially outermost portion of the inner side or surface of the part 32 and hence also away from the internal surface 21. Such situation prevails even if the damper is caused to rotate about the axis X at a high or very high speed, i.e., when the convolutions 27 are subjected to the action of pronounced centrifugal forces.

The feature that the exposed side or surface 31a of the base 31 of the slide element 30 shown in FIG. 2 is flat or predominantly or substantially flat and parallel to the adjacent surface of the retainer 16 exhibits the advantage that the retainer can transmit force to the slide element 30 (and hence to the respective end of the coil spring 8) in a highly predictable fashion. As already mentioned hereinbefore, the slide element at the other end of the coil spring 8 and such other end of the spring 8 are or can be mirror images of those shown in FIG. 2. Unless otherwise stated, this also applies for the slides, slide elements and bumpers as well as end portions of coil springs shown in FIGS. 3 to 6.

Figure 3:
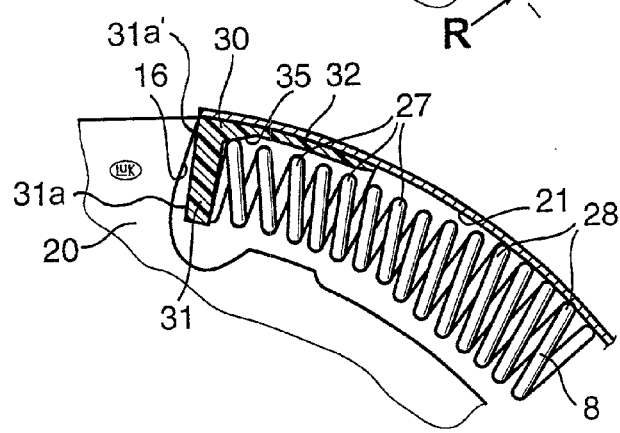
FIG. 3 shows a detail similar to that of FIG. 2 but forming part of a modified torsional vibration damper.

The surface 31a of the base 31 of the slide element 30 shown in FIG. 2 is parallel to the adjacent surface of the retainer 16. On the other hand, the outer surface 31a of the base 31 of the slide element 30 shown in FIG. 3 is inclined relative to the adjacent surface of the retainer 16. The arrangement is such that only the radially outermost portion of the surface 31a abuts the surface of the retainer 16. The slide element 30 cooperates with the retainer to generate a force which urges the part cylindrical portion 32 radially inwardly, i.e., away from pronounced frictional engagement with the internal surface of the component 2.

An advantage of the embodiment which is shown in FIG. 3 is analogous to that of the aforedescribed embodiment of FIG. 2. Thus, instead of being urged radially inwardly only by the flat surface 35 of the slide element 30, the convolutions 27 of the coil spring 8 of FIG. 3 are urged radially inwardly by the radially outermost portion of the retainer 16, i.e., the latter urges the convolutions 27 radially inwardly together with the slide element 30.

Figure 4:
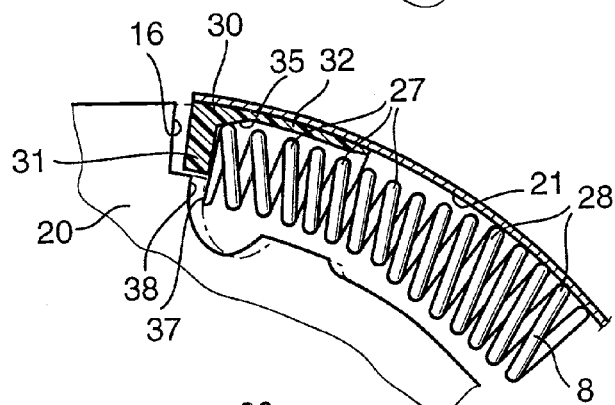
FIG. 4 is a similar view of a structure constituting a second modification of that shown in FIG. 2.

FIG. 4 shows a further modification of the structure which is illustrated in FIGS. 1 and 2. The slide element 30 has a base 31 which is smaller than those shown in FIGS. 2 and 3 and overlies only a portion of the adjacent outermost convolution 27 of the coil spring 8. Such outermost convolution 27 is trimmed at 37 and its flattened left-hand side lies flush against the adjacent surface of the trimmed base 31. The retainer 16 has a stepped portion 38 which is a projection in contact with the truncated (at 37) outermost convolution 27 radially inwardly of the base 31. The stepped portion 38 is configured and dimensioned in such a way that, when the slide element 30 (i.e., the coil spring 8) is to bear or reacts against the retainer 16, the stepped portion 38 contacts the coil spring 8 before the base 31 of the slide element 30 reaches the retainer 16 of the part 20. This ensures that, especially when the coil spring 8 is subjected to a sudden stress in response to rapid and rather pronounced turning of one of the components 2 and 3,20 relative to the other component, the outermost convolution 27 is stressed by the projection 38 before the base 31 of the slide element 30 reaches the retainer 16. Such mode of operation of the damper including the structure of FIG. 4 is of particular advantage if the convolutions 27 at the end of the coil spring 8 lie flush against each other.

The retainer 16 constitutes a radially outwardly extending arm of the washer-like part 20 of the component An important advantage of the embodiment which is shown in FIG. 4 is that a portion of the force which the component 3,20 transmits to the illustrated end (convolutions 27) of the coil spring 8 is transmitted (by the projection or stepped portion 38) directly to the coil spring, namely to the trimmed portion 37 of the nearest convolution 27) and the remainder of such force is transmitted to the coil spring 8 indirectly by way of the base 31 of the slide element 30. This contributes to longer useful life of the slide element 30. It has been found that the embodiment of FIG. 4 contributes to longer useful life of the slide element 30 because the base 31 is much less likely to be deformed in response to abrupt transmission of force from the part 20 of the component 3,20 to the coil spring 8. The initially applied part of the force is transmitted radially inwardly to the portion 37 of the outermost convolution 27, and the next-following part of the force being furnished by the part 20 via retainer 16 is applied radially outwardly of the portion 37, i.e., to the base 31 of the slide element 30 and thence to the adjacent convolution 27 of the coil spring 8.

Figure 5:
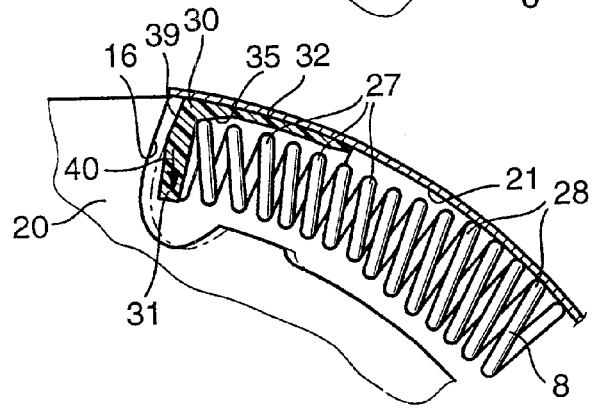
FIG. 5 is a similar view of a structure which constitutes a third modification of that shown in FIG. 2.

FIG. 5 shows a portion of a modified torsional vibration damper. The retainer 16 of the part 20 of the component 3,20 is configured in the same way as in the embodiment of FIG. 3, i.e., it has a concave surface which confronts the base 31 of the slide element 30. However, the base 31 of the slide element 30 has a surface which confronts the concave surface of the retainer 16 and includes a radially outer portion 39 which is at least substantially parallel to the adjacent radially outermost portion of the concave surface. This ensures that, in the event of force transmission between the part 20 of the component 3,20 and the base 31, a component of such force acts radially inwardly as indicated by arrow 40 which, in turn, ensures a reduction of friction between the external surface of the portion 32 of the slide element 30 and the internal surface 21 in the chamber 29.

FIG. 6 illustrates a resilient unit which employs two arcuate coil springs 41, 42 operating in series. The inner radii R of the coil springs 41, 42 are identical, and each of these coil springs includes a set of larger-diameter intermediate convolutions 44 and two sets of smaller-diameter outer convolutions 46, 48 which flank the respective sets 44. Those sets of convolutions 46 of each of the two coil springs 41, 42 which are remote from a centrally located slide 50 abut against discrete slide elements 54, 55 each of which can be identical with or can resemble that (shown at 30) in each of FIGS. 2 to 5, especially those shown in FIGS. 2 and 3.

The outer diameters of the two sets of convolutions 46 are or can be identical. On the other hand, the outer diameters of the two sets of convolutions 48 decrease in directions toward each other, namely toward the substantially disc-shaped portion or base 50a of the substantially T-shaped slide (intermediate shoe) 50. The slide 50 further comprises two substantially trough-shaped (part cylindrical) portions 51, 52 which partially surround the adjacent convolutions 48 of the coil springs 41 and 42. The diameters of the convolutions 48 of each of the two coil springs decrease stepwise toward the base 50a of the slide 50. The outer sides of the trough-shaped portions 51 and 52 of the slide 50 are adjacent to or abut the concave internal surface bounding the radially outermost portion of the chamber defined by the components 2 and 3,20 (not shown in FIG. 6) of the damper employing the coil springs 41 and 42.

An advantage of the slide 50 is that it prevents direct rubbing or other contact between the two sets of convolutions 48. Furthermore, the slide 50 eliminates the possibility of normally undesirable interlocking of the left-hand end convolution(s) 48 of the coil spring 42 with the right-hand end convolution(s) 48 of the coil spring 41.

FIG. 7 shows a portion of a modification of the structure shown in FIG. 6. A shoe or slide 60 has a disc-shaped base 60a which is disposed between one end of a first arcuate coil spring 57 and one end of a composite coil spring composed of two interfitted coil springs 58, 59. Thus, the coil springs 58, 59 and 57 operate in series, and the coil springs 58, 59 operate in parallel. The outer diameters of convolutions of the inner coil spring 59 are somewhat smaller than the inner diameters of convolutions of the outer coil spring 58.

The slide 60 further comprises a substantially trough-shaped (part cylindrical) part 61 which extends from the base 60a and surrounds the radially outer portions of convolutions at the illustrated end of the coil spring 57. The external surface of the part 61 is slidable along the internal surface 21 of the component 2. The character 62 denotes a pin- or plug-shaped projection or protuberance which extends into the adjacent end convolutions of the outer coil spring 58 and abuts the adjacent end convolution of the inner coil spring 59. The diameter of the part 62 can equal or approximate the inner diameter(s) of the surrounding end convolution(s) of the coil spring 57.

FIG. 8 shows a portion of an arcuate coil spring 64 having a constant inner radius and composed of alternating convolutions respectively having smaller and larger inner diameters. The illustrated two sets of smaller-diameter convolutions 65a are surrounded by trough-shaped part cylindrical slides 66 and 67 which are but need not be identical and have smooth external surfaces slidable along the internal surface 21 in the arcuate chamber 29 of the component 2 (not shown in FIG. 8). The radially outermost portions of the larger-diameter convolutions 65 of the coil spring 64. are nearer to the internal surface 21 than the radially outermost portions of the smaller-diameter convolutions 65a but are shown as being spaced apart from the internal surface.

The outer diameters of the convolutions 65a of each set of such convolutions decrease from the ends toward the central portions of the respective slides 66, 67. Each such set includes at least one median or central convolution (68 within the slide 66 and 69 within the slide 67), and the radially outermost portions of such median convolutions are anchored in the respective slides. To this end, the slide 66 has an internal groove 70 and the slide 67 has an internal groove 71. The median convolutions 68 and 69 cooperate with the respective slides 66, 67 to prevent the remaining convolutions 65*a* of the illustrated sets of smaller-diameter convolutions from moving circumferentially relative to the slides and/or vice versa.

The outer diameters of the median convolutions 68 and 69 can equal or approximate the outer diameters of the larger-diameter convolutions 65. The outer diameters of the convolutions 65*a* increase (e.g., gradually) from the respective median convolutions 68, 69 toward the nearest larger-diameter convolutions 65.

FIG. 9 shows a portion of a torsional vibration damper which differs from the damper of FIG. 8 in that the smaller-diameter convolutions 65*a* which are immediately adjacent the median or intermediate convolutions 68 and 69 actually abut the respective median convolutions. Such arrangement greatly reduces the likelihood of separation of the radially outermost portions of median convolutions 68, 69 from the respective slides 66, 67 in storage and/or in actual use. Furthermore, such arrangement renders it possible to reliably clamp an elastic slide 66 or 67 to the respective convolution 68 or 69 prior to insertion of the coil spring 64 into the chamber. This, in turn, contributes to simplicity and lower cost of assembly of the torsional vibration damper embodying the slides 66 and 67.

Figure 11:
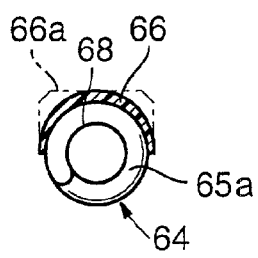
FIG. 11 is a transverse sectional view as seen in the direction of arrows from the line XI-XI of FIG. 9.

As can be seen in FIG. 11, the slide 66 extends around the radially outer portions of the adjacent smaller-diameter convolutions 65, 68 along an arc of approximately and preferably not less than 180°. The broken line 66*a* indicates the polygonal outline of a slide which can be utilized in lieu of the slide 66. The slide 67 is or can be identical with the slide 66.

Referring to FIG. 10, the slides 73, 74 respectively replace the slides 66, 67 which are shown in FIGS. 8 and 9. The slides 73, 74 are not positively coupled to the adjacent smaller-diameter convolutions 65*a*, and the median or intermediate smaller-diameter convolutions 68', 69' are spaced apart from the adjacent convolutions 65*a*. The (smooth) internal surfaces of the slides 73, 74 are devoid of grooves or any other means which could facilitate positive coupling of the adjacent smaller-diameter convolutions 65*a*, 68' and 65*a*, 69' thereto. The arrangement of FIG. 10 ensures that the slides 73, 74 cannot be shifted, or cannot be shifted to a considerable extent, relative to any of the adjacent smaller-diameter convolutions. Each of the two sets of smaller-diameter convolutions shown in FIG. 10 includes a minimum-diameter median convolution (68', 69') and additional smaller-diameter convolutions 65*a* the diameters of which increase as seen longitudinally of the coil spring 64 and at both sides of the respective intermediate convolution (68', 69').

FIG. 12 shows that the slide 73 surrounds the radially outer portions of the adjacent smaller-diameter convolutions 65*a*, 68' along an arc in excess of 180° but less than 360°. The same applies for the slide 74 and the adjacent smaller-diameter convolutions 65*a*, 69' shown in FIG. 10. The slide 73 has a smooth outer surface 73' and a smooth inner surface 73". In view of the length of the slide 73 (as seen circumferentially of the adjacent convolutions 65*a*, 68' of the coil spring 64), the connection which is established between the coil spring 64 and the slide 73 is actually a connection by snap action or by clamping action.

The outer surface 73' of the slide 73 is a smooth partly cylindrical surface. However, and depending upon the outline of the internal surface 21 of the adjacent component (such as 2) of the improved torsional vibration damper, the part cylindrical outer surface 73' can be replaced with an outer surface having an oval outline or a polygonal outline (as shown at 66*a* in FIG. 11). A departure of the outline of the outer surface of the slide from a circular outline ensures an even more accurate guidance of the slide or slides in the respective component of the improved torsional vibration damper.

Figure 13:
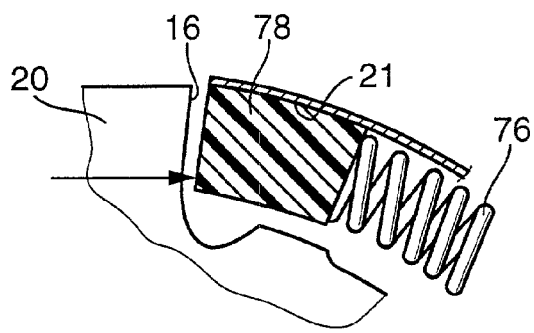
FIG. 13 is a fragmentary sectional view similar to that of FIG. 2 but showing a bumper in lieu of a slide element.

FIG. 13 shows a portion of a torsional vibration damper including an arcuate coil spring 76 the illustrated end convolution of which abuts an elastic circular cylindrical bumper 78 which, in turn, abuts the retainer 16 of part 20 of the component 3,20. The bumper 78 is a cylinder which is slidable along the internal surface 21 of the component 2. The curvature of the longitudinal axis of cylindrical bumper 78 is or can be the same as that of the coil spring 76. This bumper can be made of a suitable resilient plastic material. If desired or necessary, the illustrated solid bumper 78 can be replaced with an elastic bumper which is provided with slits, holes and/or similar features adapted to enhance its softness, its ability to damp and/or other desirable characteristics. The purpose of the bumper 78 is to damp abrupt shocks which develop in the structure employing the improved torsional vibration damper and some of which should be taken up by the bumper. An advantage of the bumper 78 is that, owing to its cylindrical configuration, it can completely fill the space between the retainer 16 and the nearest convolution of the coil spring 76.

Figure 14:
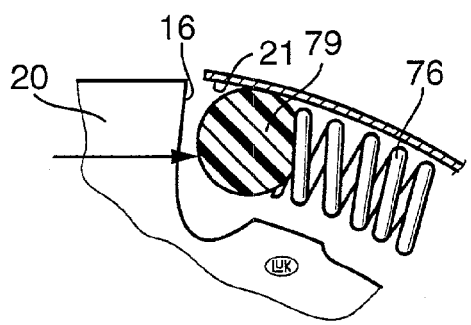
FIG. 14 is a view similar to that of FIG. 13 but showing a modified bumper.

In the embodiment of FIG. 14, the cylindrical bumper 78 is replaced with an at least substantially spherical elastic bumper 79 which extends, in part, into the adjacent convolution(s) at the respective end of the arcuate coil spring 76 and abuts the retainer 16 of part 20 of the component 3,20 of the type shown in FIG. 1.

The width of the bumper 78 or 79, as measured radially of the common axis X of the components including the part 20, can equal or approximate the outer diameter of the adjacent convolution(s) of the respective coil spring 76.

An advantage of the spherical bumper 79 is that it contributes to a pronounced simplification of assembly of the damper. Thus, the spherical bumper 79 can be properly installed between the retainer 16 and the adjacent end convolution of the coil spring 76 in any randomly selected orientation because its effectiveness is not dependent upon its orientation relative to the parts 16 and 76.

An advantage which is shared by the bumpers 78 and 79 of FIGS. 13 and 14 is that the outermost convolution of the respective coil spring 76 is invariably prevented from being struck directly by the retainer 16. The reason is that the diameter of the cylindrical bumper 78 as well as the diameter of the spherical bumper 79 at least equals the outer diameter of the nearest convolution of the respective coil spring 76.

Figure 15:
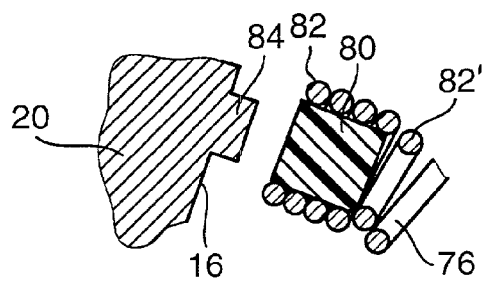
FIG. 15 is a view similar to that of FIG. 13 or 14 but showing a third bumper.

FIG. 15 shows an elastic cylindrical bumper 80 which extends into the adjacent convolutions 82 at the respective end of the arcuate coil spring 76 and also abuts a protuberance or projection 84 provided on the retainer 16 of the part 20. The inner diameter of the convolution 82' is smaller than those of the end convolutions 82 and that of the bumper 80 so that the latter cannot advance deeper into the coil spring 76 (under the action of the projection 84) and away from the retainer 16 in response to repeated axial expansion and contraction of the coil spring.

Figure 16:
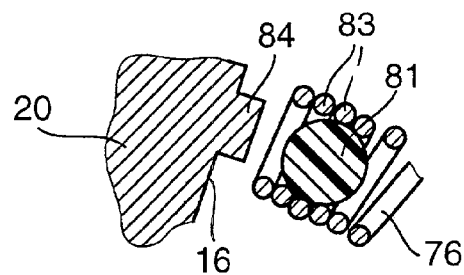
FIG. 16 is a view similar to that of FIG. 14 but showing a fourth bumper.

The structure of FIG. 16 is analogous to that which is shown in FIG. 15. The cylindrical bumper 80 is replaced with a spherical bumper 81 which is held against further penetration into the coil spring 76 by a set of convolutions 83 having inner diameters smaller than the diameter of the bumper 81. The inner diameters of the convolutions 83 decrease in a direction from the retainer 16 toward the center of the coil spring 76. This even more reliably prevents the projection 84 from propelling the spherical bumper 81 deeper into the coil spring 76.

The elastic bumpers 78, 79, 80 and 81 contribute to more satisfactory on-off (start-stop) operation as well as to more satisfactory reaction of the damper to changes of load upon the damper. Thus, the retainer 16 engages first or only the adjacent bumper (see FIGS. 13 and 14) or engages the bumper (80 or 81) before it comes in contact with the nearest convolution at the respective end of the coil spring 76. As already mentioned above, the damping action of the bumper can be enhanced by providing it with slits, holes, cavities or analogous elasticity enhancing configurations.

The bumpers 80 and 81 also exhibit certain important advantages even though they are received in the adjacent end convolutions of the respective coil springs 76. Thus, and since the inner diameters of such convolutions are at least slightly smaller than or at most equal to the diameters of the bumpers 80 and 81, the properly inserted bumpers remain in their illustrated positions before and while being struck by the respective projections or protuberances 84. Thus, the bumpers 80, 81 can be assembled with the respective coil springs 76 prior to installation of such coil springs between the components of the damper. This simplifies the assembly of the coil springs 76 with the respective bumpers and thus contributes to lower cost of the damper.

The diameter of a cylindrical projection 84, or the maximum transverse dimension of a non-cylindrical projection which is utilized in lieu of the projection 84, is preferably less than the inner diameter of the adjacent outermost convolution of the respective coil spring 76. This ensures that, when the retainer 16 begins to move toward the adjacent end convolution of the respective coil spring 76, the transmission of force to the coil spring takes place only by way of the respective damper 80 or 81; the retainer actually strikes the adjacent end convolution only if and when the bumper 80 or 81 has undergone a certain deformation, namely when the projection 84 is fully confined in the adjacent end of the coil spring 76.

Figure 17:
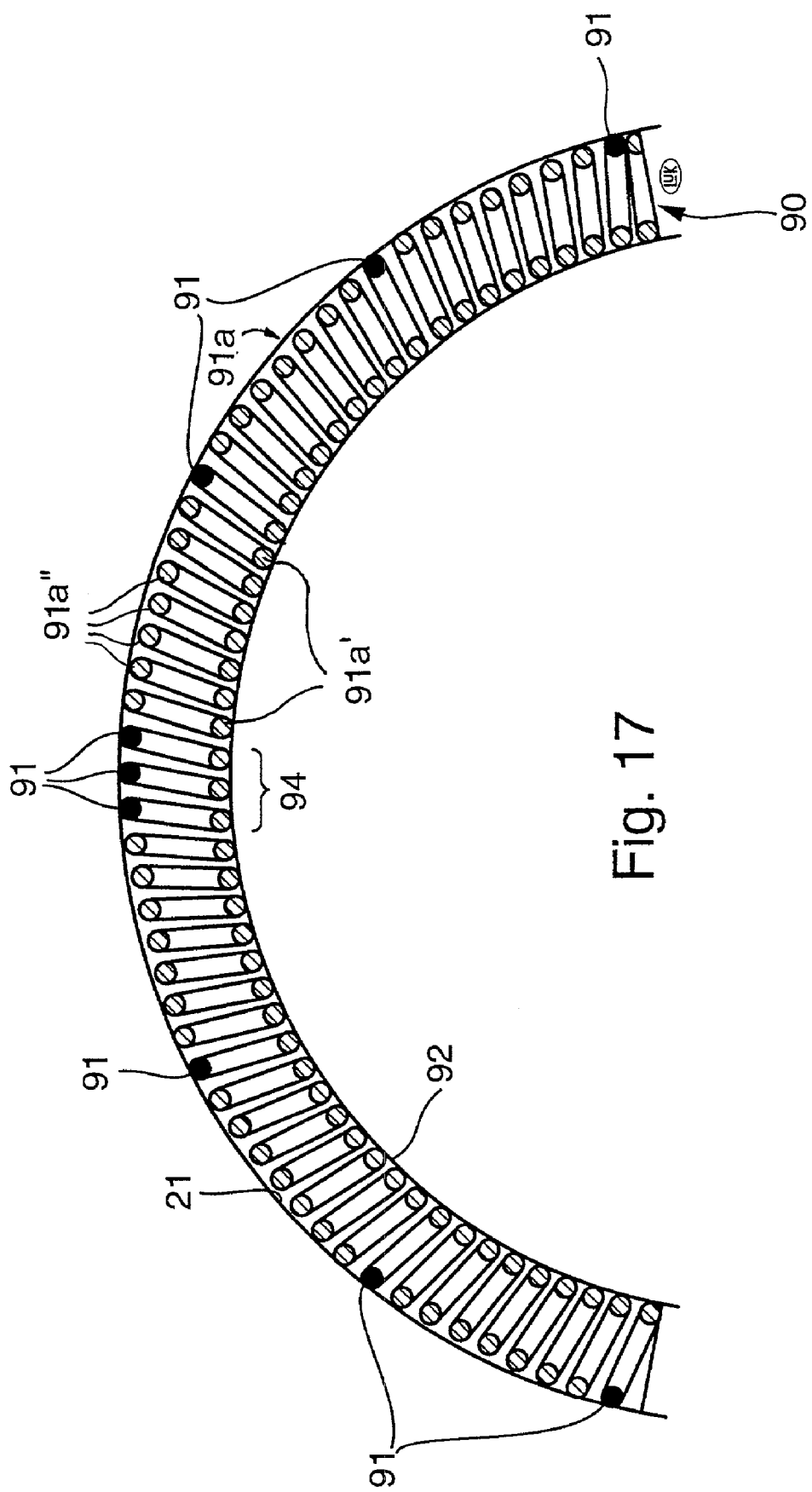
FIG. 17 is a sectional view of still another coil spring.

FIG. 17 shows a semicircular arcuate coil spring 90 having a constant inner radius 92 and convolutions adjacent the internal surface 21 in the chamber of one of the components (not shown) of the damper employing the spring 90. The damper which utilizes the coil spring 90 reduces or minimizes or prevents the development of friction between the convolutions and the internal surface 21 even though it does not employ any slides and/or slide elements.

The coil spring 90 comprises several spaced apart convolutions 91 having outer diameters larger than those of the remaining majority of convolutions 91*a*. Since the inner radius 92 of the arcuate coil spring 90 is constant and the outer diameters of the convolutions 91*a* are smaller than those of the convolutions 91, the surface 21 is or is likely to be contacted only by the relatively small number of convolutions 91 but not by the much larger number of convolutions 91*a*.

The convolutions 91 serve to guide the coil spring 90 during movement relative to the one and/or the other of the components with retainers at the longitudinal ends of the coil spring. The median portion of the coil spring 90 includes three immediately adjacent large-diameter coil springs 91. Such arrangement even more reliably prevents the smaller-diameter convolutions 91*a'* from abutting the internal surface 21.

The outer diameters of the illustrated sets of convolutions 91*a* decrease gradually from the adjacent larger-diameter convolutions 91 (or 93) toward the median smaller-diameter convolutions. For example, and referring to the part of the coil spring 90 between the twelve and one o'clock positions, as seen in FIG. 17, the outer diameters of the two outermost convolutions 91*a'* adjacent the respective larger-diameter convolutions 91 decrease gradually toward the median convolutions 91*a"*.

The radially outermost portions of the smaller-diameter convolutions (such as 91*a*, 91*a'* and 91*a"*) are not likely to reach the internal surface 21 in normal use of the damper if the latter is used in the power train of a motor vehicle and the rotary output element of the engine is caused to rotate at an RPM of less than 3000. This is achieved by the the relatively small number of larger-diameter convolutions 91 which alternate with and/or are provided adjacent to the outer end or ends of one outermost set or both outermost sets of convolutions 91*a*. The smaller-diameter convolutions 91*a* might move radially outwardly to contact the internal surface 21 when the coil spring 90 is compressed (shortened) to such an extent that the neighboring convolutions 91*a* assume positions in which they lie flush against each other, i.e., when they together act as a solid block without any further freedom of additional reduction of the length of the set of convolutions 91*a* in the axial direction of the coil spring 90.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torsional vibration dampers for use in the power trains of motor vehicles or the like and, therefore, such adaptations should and are intended to be comprehended within the meaning and range of equivalence of the appended claims.

What is claimed is:

1. A torsional vibration damper, comprising:
   a first component turnable about a predetermined axis;
   a second component turnable about said axis with and relative to said first component; and
   at least one elongated compressive coil spring interposed between said components and arranged to oppose turning of said components relative to each other, said at least one coil spring having a first end portion bearing upon a first retainer turnable with said first component and a second end portion reacting against a second retainer turnable with said second component
   wherein the at least one coil spring has a length that is subdivided into at least two different sections, and wherein the at least two different sections respectively comprise at least one first set of convolutions with first outer diameters and at least one second set of convolutions with second outer diameters, said second outer diameters being constant over said at least one second set and said first diameters being smaller than said second diameters, and wherein the at least one coil spring is constrained in a centrifugal direction through slide elements at least in individual locations within the torsional vibration damper, said slide elements having flank portions extending at least partially along the at least one first set of convolutions, wherein each of the convolutions of said at least one first set and said at least one second set has a radially innermost portion relative to said predetermined axis, and wherein said radially innermost portions are located at substantially equal radial distances from said predetermined axis, and wherein all of the windings have the same cross-sectional wire profile, wherein the at least one coil spring in a stress-free state has an arcuate shape that curves over the length of the coil spring.

2. The damper of claim 1, wherein said first and second components constitute discrete flywheels of a composite flywheel.

3. The damper of claim 1, wherein the convolutions of said at least one first set include two end convolutions and at least one intermediate convolution, the outer diameters of said end convolutions being greater than the outer diameter of said at least one intermediate convolution.

4. The damper of claim 1, wherein the convolutions of said at least one first set include two end convolutions and a plurality of intermediate convolutions, the outer diameters of convolutions of said at least one first set decreasing from said outer convolutions toward at least one median convolution of said intermediate convolutions.

5. The damper of claim 1, wherein at least one of said components has an internal surface defining an arcuate chamber for said at least one coil spring, the convolutions of said at least one first set being spaced apart from said internal surface and the convolutions of said a least one second set being nearer to said internal surface than the convolutions of said at least one first set.

6. The damper of claim 5, wherein the convolutions of said at least one second set are in sliding contact with said internal surface.

7. The damper of claim 5, further comprising at least one slide disposed in said chamber between said internal surface and the convolutions of said at least one first set.

8. The damper of claim 7, wherein said at least one slide is movable relative to said components and surrounds the convolutions of said at least one first set.

9. The damper of claim 8, wherein said at least one slide includes a cylinder having an at least substantially smooth outer surface and an inner surface adjacent the convolutions of said at least one first set.

10. The damper of claim 9, wherein said inner and outer surfaces extend along an arc of less than 360 degrees, as seen circumferentially of the convolutions of said at least one first set.

11. The damper of claim 7, wherein at least a portion of said at least one slide consists of a plastic material.

12. The damper of claim 7, wherein said slide has an inner surface provided with a groove for a radially outer portion of at least one convolution of said at least one first set.

13. The damper of claim 1, wherein said at least one spring has first and second ends and said at least one first set of convolutions is disposed at one end of said at least one spring, and further comprising a slide element abutting said first retainer and surrounding said convolutions of said at least one first set, said slide element being arranged to share the movements of said first component and being in sliding contact with said second component.

14. The damper of claim 13, wherein at least one of said components has an internal surface defining an arcuate chamber for said at least one spring and said slide element includes a substantially disc-shaped base between said first retainer and one convolution of said at least one first set, said slide element further including a part cylindrical portion disposed between at least one convolution of said at least one first set and said internal surface.

15. The damper of claim 14, wherein said part cylindrical portion of said slide element has an inner surface including an at least substantially conical portion tapering toward said substantially disc-shaped base and surrounding said at least one convolution of said at least one first set.

16. The damper of claim 14, wherein said substantially disc-shaped base of said slide element has an at least substantially flat surface adjacent said first retainer.

17. The damper of claim 14, wherein said substantially disc-shaped base and said first retainer have surfaces including portions which abut each other and are remotest from the common axis of said components.

18. The damper of claim 17, wherein said substantially disc-shaped base and said first retainer have first and second surfaces which are adjacent each other and include abutting portions remotest from the common axis of said components.

19. The damper of claim 14, wherein said substantially disc-shaped base overlies a portion of the adjacent convolution of said at least one first set, said first component having at least one projection abutting said adjacent convolution.

20. The damper of claim 19, wherein said projection includes a stepped portion of said first component.

* * * * *